US008556506B2

(12) United States Patent
Torti et al.

(10) Patent No.: US 8,556,506 B2
(45) Date of Patent: Oct. 15, 2013

(54) TEMPERATURE-CURRENT TRANSDUCER

(75) Inventors: Giuseppe Torti, Alzano Scrivia AL (IT); Dario Zambotti, Vimodrone MI (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 43 days.

(21) Appl. No.: 13/291,394

(22) Filed: Nov. 8, 2011

(65) Prior Publication Data
US 2012/0120987 A1  May 17, 2012

(30) Foreign Application Priority Data
Nov. 11, 2010  (IT) ............... VA2010A0083

(51) Int. Cl.
G01K 7/00 (2006.01)
H01L 35/00 (2006.01)
H01L 37/00 (2006.01)

(52) U.S. Cl.
USPC ........................................ 374/183; 327/513

(58) Field of Classification Search
USPC ............... 374/183; 73/700; 361/106
See application file for complete search history.

(56) References Cited

U.S. PATENT DOCUMENTS

| | | | |
|---|---|---|---|
| 4,467,386 A * | 8/1984 | Wasson | 361/106 |
| 4,947,057 A | 8/1990 | Czarnocki et al. | 307/310 |
| 5,068,595 A | 11/1991 | Kearney et al. | 323/316 |
| 5,835,553 A | 11/1998 | Suzuki | 377/25 |
| 6,198,267 B1 | 3/2001 | Bakker et al. | 323/316 |
| 6,489,831 B1 * | 12/2002 | Matranga et al. | 327/512 |
| 6,810,745 B2 * | 11/2004 | Makino | 73/708 |
| 2008/0061865 A1 | 3/2008 | Koerner | 327/512 |

FOREIGN PATENT DOCUMENTS

| | | |
|---|---|---|
| EP | 2128579 | 12/2009 |
| JP | 2009033059 | 2/2009 |

* cited by examiner

*Primary Examiner* — Harshad R Patel
*Assistant Examiner* — Brandi N Hopkins
(74) *Attorney, Agent, or Firm* — Allen, Dyer, Doppelt, Milbrath & Gilchrist, P.A.

(57) ABSTRACT

A temperature-current transducer includes first and second voltage dividers, with the first voltage divider including a thermistor in an environment. An operational amplifier has a first input coupled to an intermediate node of the first voltage divider, and a second input coupled to an intermediate node of the second voltage divider. A cascode stage is configured to be biased in a conduction state and is controlled by the operational amplifier. The cascode stage includes a first current terminal coupled to the intermediate node of the second voltage divider. A current mirror is coupled to a second current terminal of the cascode stage, and is configured to mirror on an output line current flowing through the cascode stage that is representative of temperature differences between a temperature in an environment of the thermistor and a reference temperature.

15 Claims, 2 Drawing Sheets

TEMPERATURE-CURRENT TRANSDUCER

FIELD OF THE INVENTION

The present invention relates to temperature sensors, and, more particularly, to a temperature-current transducer adapted to generate an output current substantially proportional to the difference between a sensed temperature and an adjustable reference temperature.

BACKGROUND OF THE INVENTION

Commonly used temperature sensors are Negative Temperature Coefficient (NTC) thermistors. These devices generate an output current that varies according to a nonlinear function with the sensed temperature of the environment in which they are installed.

There are numerous applications in which it is desirable to sense the temperature of an environment with a circuit capable of generating an electrical signal that varies linearly as a function of the temperature.

U.S. Pat. No. 5,068,595 discloses an adjustable temperature-dependent current generator having an adjustable linear relation to temperature. This prior current generator is based on a transconductance current multiplier, and comprises two temperature-dependent current generators.

U.S. Pat. No. 6,198,267 discloses a current generator that generates an output current substantially proportional to the absolute temperature of the base-emitter junctions of two bipolar transistors biased with respective constant currents. This current generator needs a switching network adapted to alternately connect one of the two bipolar transistors to the output node, through which the output current is delivered, and to disconnect the other transistor, and vice versa.

U.S. Pat. No. 4,947,057 discloses a mass fluid flow sensor with a circuit for compensating measurement fluctuations due to temperature variations of the fluid.

Prior temperature transducers are burdened by at least one of the following drawbacks: a temperature sensitive component is inserted in a feedback loop, therefore, temperature fluctuations alter the working point of the feedback loop and thus the loop gain, which may lead to instability of the loop; a plurality of relatively expensive components, such as thermistors, are required; and difficult to adjust over a broad range the gain of the temperature-current characteristic and the reference temperature at which the output current is null.

SUMMARY OF THE INVENTION

An object of the present invention is to provide architectures of temperature transducers adapted to generate an output signal representative of temperature differences between the temperature of an environment and a fixed reference temperature.

The architectures may have a significantly reduced number of components, and may require only a single thermistor that is not inserted in the feedback loop of the transducer. These features allow adjustment in a broad range the gain of the temperature-current characteristic and the temperature at which the output current of the transducer is null.

These important results are achieved with the temperature transducer as defined in the claims.

DETAILED DESCRIPTION OF THE PREFERRED EMBODIMENTS

Figure 1:
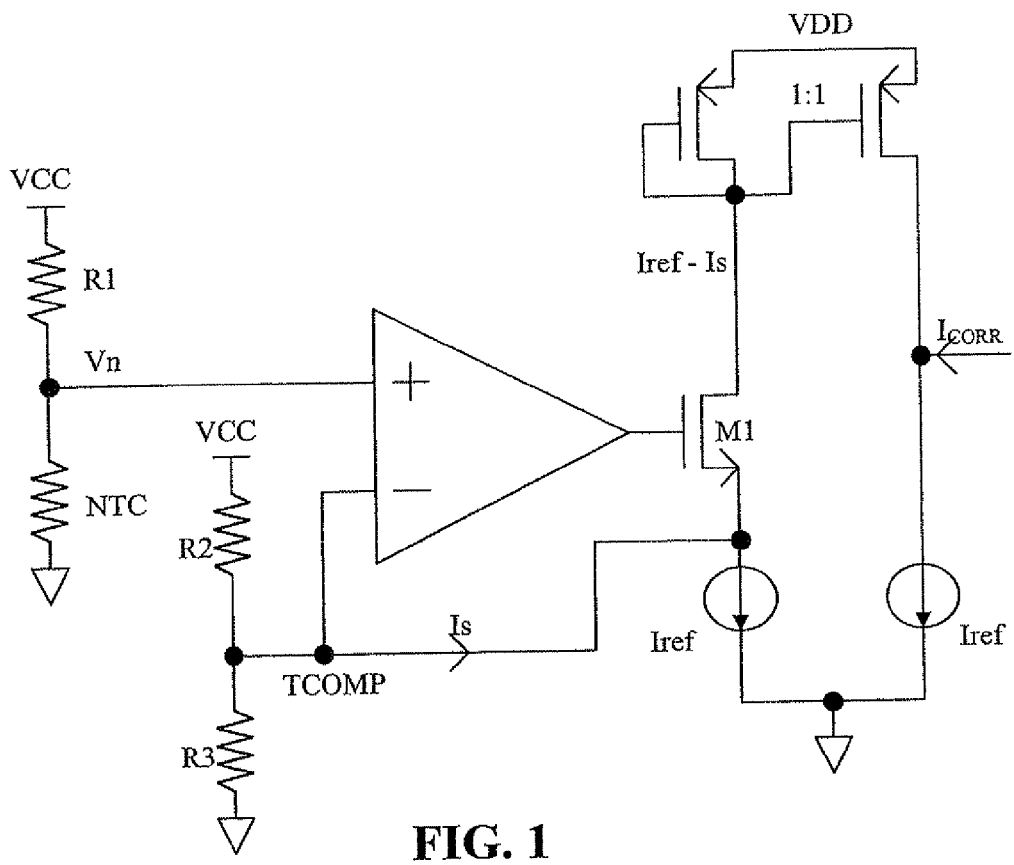
FIG. 1 depicts an embodiment of the temperature transducer with a single thermistor out of the feedback loop that generates the output current in accordance with the present invention.
Figure 2:
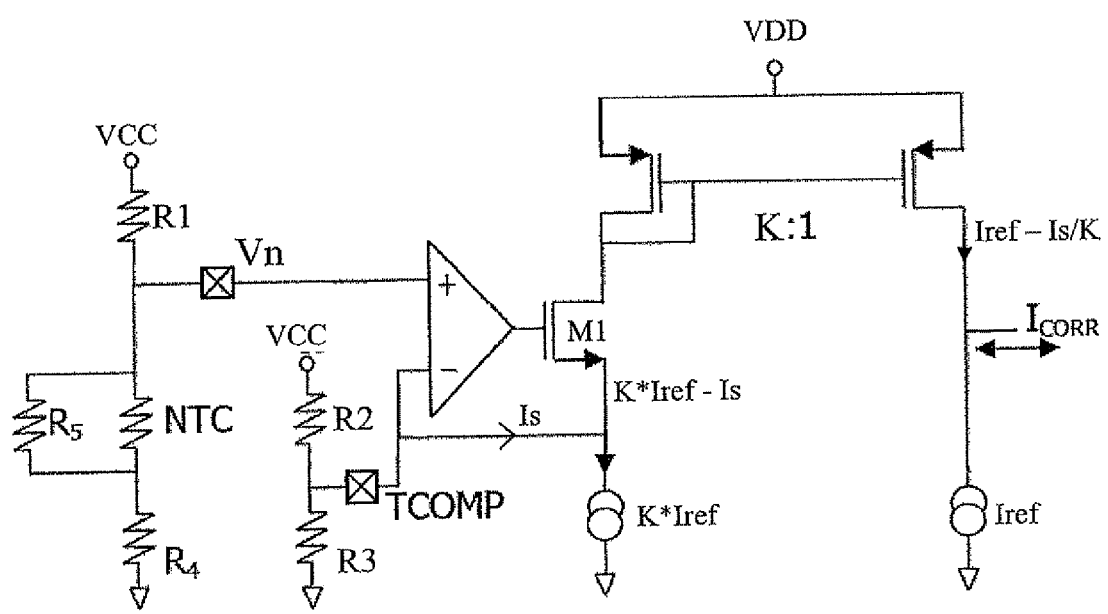
FIG. 2 depicts another embodiment of the temperature transducer with a single thermistor out of the feedback loop that generates the output current in accordance with the present invention.

Exemplary architectures of the temperature-current transducers are depicted in FIGS. 1 and 2. They basically comprise a first voltage divider having a thermistor (NTC) in the environment the temperature of which is to be sensed, and a second voltage divider in parallel to the first voltage divider. An operational amplifier virtually shorts between them the intermediate nodes of the two voltage dividers, and drives a cascode stage that is crossed by the output current that on its turn is mirrored on an output node by a current mirror.

It is evident that the illustrated architectures are much simpler than prior architectures. Moreover, the thermistor is installed out of the feedback loop, thus temperature variations do not alter the working point of the loop. This avoids any stability problems.

For discussion purposes, reference will be made to the architecture of FIG. 1, although the same considerations apply for the architecture of FIG. 2. The output current ICORR is null at a reference temperature T0 when the following condition is met:

$$\frac{NTC_{(T0)}}{R_1 + NTC_{(T0)}} = \frac{R_3}{R_2 + R_3}$$

wherein NTC(T0) is the resistance of the thermistor at the reference temperature T0. When the above condition is met, the current Is is null. Therefore, the reference temperature T0 at which the thermistor generates a null output current may be determined in a broad range by fixing the values of the resistors of the two voltage dividers.

The output current ICORR is substantially a mirrored replica of the current Is, that is given by the following equation:

$$I_s = \frac{Vcc}{R_2} - Vn_{(T)} \cdot \left(\frac{1}{R_2} + \frac{1}{R_3}\right) = \frac{Vcc}{R_2} - \frac{Vcc \cdot NTC_{(T)}}{R_1 + NTC_{(T)}} \cdot \left(\frac{1}{R_2} + \frac{1}{R_3}\right)$$

wherein Vn(T) is the voltage Vn at a generic temperature T of the thermistor NTC.

The gain with which the current Is varies because of temperature variations in a neighborhood of the reference temperature T0 is tied to the first derivative of the current Is in respect to the temperature T calculated at the reference temperature T0:

$$\left.\frac{dI_s}{dT}\right|_{T=T0} = -Vcc \cdot R_1 \cdot \left(\frac{1}{R_2} + \frac{1}{R_3}\right) \cdot \left.\frac{\frac{dNTC_{(T)}}{dT}}{(R_1 + NTC_{(T)})^2}\right|_{T=T0}$$

and may be determined by fixing the values of the resistors of the two voltage dividers.

To have a substantially linear temperature current characteristic, it is preferable to make the temperature-current characteristic have an inflection point at the reference temperature T0. This is to nullify the second derivative of the current Is in respect to the temperature calculated at the reference temperature T0, i.e., and to satisfy the following condition:

$$\frac{d}{dT}\left(\frac{\frac{dNTC_{(T)}}{dT}}{(R_1+NTC_{(T)})^2}\right)\bigg|_{T=T0}=0$$

that may be met practically for any reference temperature T0 by choosing accordingly the resistor R1.

Similar equations to the above equations may be formulated for the transducer of FIG. 2 considering that the voltage Vn is not produced on the thermistor NTC, but on the electrical series between the resistor R4 and the electrical parallel between the resistor R5 and the thermistor.

When the temperature of the thermistor NTC differs from the reference temperature T0, a nonnull current Is is generated. The current Is flows through the cascode stage M1, biased in a conduction functioning state by the current generator Iref, and is mirrored on the output line of the transducer.

The more the resistance of the thermistor decreases, the more the current through the resistor R3 decreases, and thus the more the current Is increases, and vice versa.

Figure 3:
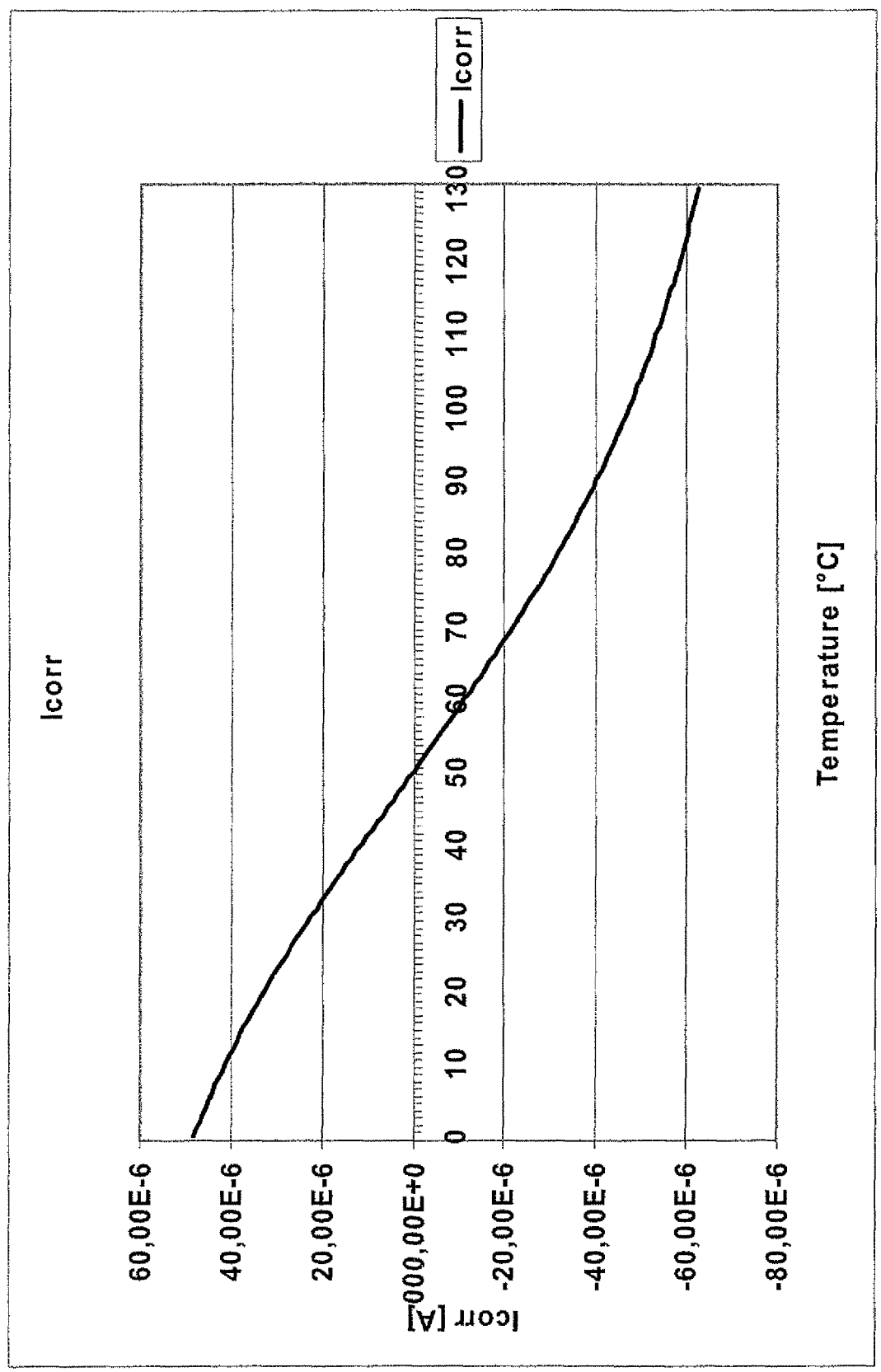
FIG. 3 is an exemplary temperature-current characteristic of the temperature transducer shown in FIG. 1.

An exemplary temperature-current characteristic of the transducer of FIG. 1 is depicted in FIG. 3. In the exemplary characteristic, the reference temperature T0 is fixed at 50° C. and the resistor R1 is determined to have an inflection point at this temperature. Similar temperature-current characteristics may be obtained also for the architecture of FIG. 2.

The architecture of FIG. 2 is more general than that of FIG. 1. As may be readily appreciated from FIG. 2, the mirroring ratio of the output current mirror determines the proportionality factor between the output current Icorr and the current Is. The sign of the current throughout the current mirror cannot invert, thus the maximum current Is that may be generated is limited by the bias current through the cascode stage M1.

The resistors R4 and R5 further enhance the linearity of the temperature-current characteristic of the transducer. Optionally, the supply voltages VCC and VDD may be equal to each other.

That which is claimed:

1. A temperature-current transducer to generate an output current representative of temperature differences between a temperature in an environment and a reference temperature, and comprising:
    a first voltage divider coupled between a first supply voltage and a reference voltage, and comprising a thermistor in the environment;
    a second voltage divider coupled in parallel to said first voltage divider;
    an operational amplifier having a first input coupled to an intermediate node of said first voltage divider, and a second input coupled to an intermediate node of said second voltage divider;
    a cascode stage configured to be biased in a conduction state and controlled by said operational amplifier, said cascode stage comprising a first current terminal coupled to the intermediate node of said second voltage divider, and a second current terminal;
    a current mirror coupled to said second current terminal of said cascode stage and configured to mirror an output line of a current flowing through said cascode stage; and
    a first reference current generator to bias said cascode stage.

2. The temperature-current transducer of claim 1, wherein resistances of said first voltage divider are adapted to make temperature-current characteristics of the temperature-current transducer have an inflection point corresponding to a null sensed temperature difference from the reference temperature.

3. The temperature-current transducer of claim 1, wherein said first voltage divider comprises a resistor coupled in series to said thermistor.

4. The temperature-current transducer of claim 3, wherein said first voltage divider further comprises a second resistor coupled in series to said thermistor, and a third resistor coupled in parallel to said thermistor.

5. The temperature-current transducer of claim 1, wherein said current mirror is coupled to a second supply voltage and comprises an output transistor, and further comprising a second reference current generator to bias said output transistor to balance current flowing therethrough when the temperature difference is null.

6. A temperature-current transducer comprising:
    a first voltage divider coupled between a first supply voltage and a reference voltage, and comprising a thermistor;
    a second voltage divider coupled between the first supply voltage and the reference voltage;
    an amplifier having a first input coupled to an intermediate node of said first voltage divider, and a second input coupled to an intermediate node of said second voltage divider;
    a cascode stage configured to be biased in a conduction state and controlled by said amplifier, said cascode stage comprising a first current terminal coupled to the intermediate node of said second voltage divider, and a second current terminal;
    a current mirror coupled to said second current terminal of said cascode stage; and
    a first reference current generator to bias said cascode stage.

7. The temperature-current transducer of claim 6, wherein resistances of said first voltage divider are adapted to make temperature-current characteristics of the temperature-current transducer have an inflection point corresponding to a null sensed temperature difference from a reference temperature.

8. The temperature-current transducer of claim 6, wherein said first voltage divider comprises a resistor coupled in series to said thermistor.

9. The temperature-current transducer of claim 8, wherein said first voltage divider further comprises a second resistor coupled in series to said thermistor, and a third resistor coupled in parallel to said thermistor.

10. The temperature-current transducer of claim 6, wherein said current mirror is coupled to a second supply voltage and comprises an output transistor, and further comprising a second reference current generator to bias said output transistor to balance current flowing therethrough when a temperature difference is null.

11. A method for generating an output current representative of temperature differences between an environment temperature and a reference temperature, the method comprising:
    connecting a first voltage divider between a first supply voltage and a reference voltage, the first voltage divider comprising a thermistor;
    connecting a second voltage divider between the first supply voltage and the reference voltage;

connecting an operational amplifier having a first input to an intermediate node of the first voltage divider, and having a second input to an intermediate node of the second voltage divider;

connecting a cascode stage to the operational amplifier, the cascode stage biased in a conduction state and controlled by the operational amplifier, the cascode stage comprising a first current terminal coupled to the intermediate node of the second voltage divider, and a second current terminal;

connecting a current mirror to the second current terminal of the cascode stage to mirror an output line of the temperature-current transducer current flowing through the cascode stage; and connecting a first reference current generator to bias the cascode stage.

12. The method of claim 11, wherein resistances of the first voltage divider are adapted to make temperature-current characteristics of the temperature-current transducer have an inflection point corresponding to a null sensed temperature difference from the reference temperature.

13. The method of claim 11, wherein the first voltage divider comprises a resistor coupled in series to the thermistor.

14. The method of claim 13, wherein the first voltage divider further comprises a second resistor coupled in series to the thermistor, and a third resistor coupled in parallel to the thermistor.

15. The method of claim 11, wherein the current mirror is coupled to a second supply voltage and comprises an output transistor, and further comprising connecting a second reference current generator to bias the output transistor to balance current flowing therethrough when the temperature difference is null.

* * * * *